United States Patent [19]

Waldbusser

[11] Patent Number: 4,848,388

[45] Date of Patent: Jul. 18, 1989

[54] EMERGENCY VALVE WITH TEST CAPABILITY

[75] Inventor: Edwin Waldbusser, Nanuet, N.Y.

[73] Assignee: Memory Metals, Inc., Norwalk, Conn.

[21] Appl. No.: 109,911

[22] Filed: Oct. 19, 1987

[51] Int. Cl.⁴ .............................................. F16K 31/64
[52] U.S. Cl. ......................................... 137/80; 251/66
[58] Field of Search ....................... 137/79, 80; 251/66

[56] References Cited

U.S. PATENT DOCUMENTS 3,664,582  5/1972  Jackson et al. .

*Primary Examiner*—Gerald A. Michalsky
*Attorney, Agent, or Firm*—Jerry Cohen

[57] ABSTRACT

Self actuating valve systems for fluid line networks comprising a main valving stem (3) with a driving-to-close bias spring (14) which is blocked by a detent ball (15) from closure against a valve seal (8), the ball itself being held by a removable pilot stem biassed to such holding action by a spring (17), the force of which can be automatically overcome at emergency temperature use condition by high force action of a shape memory spring (21). The main valving stem is manually resettable and the shape memory drivable pilot stem and related drive system are manually testable. A plurality of such valve systems are distributed in a fluid flow network for isolating an emergency temperature rise (e.g., fire region).

5 Claims, 1 Drawing Sheet

EMERGENCY VALVE WITH TEST CAPABILITY

FIELD OF THE INVENTION

The present invention relates to emergency valve apparatus articularly for use in fluid systems in process industries.

There is a serious danger in process industries of a fire causing the failure of flow controllers and/or of lines containing toxic, flammable and otherwise hazardous gases or liquids. In principle, a method to minimize this danger is the installation in process industry fluid carrying lines of a small, inexpensive, instantaneously acting, fire temperature sensitive shut off valve which is self actuating (no batteries or other power sources). Such valves could be installed in-line at frequent intervals and/or in place of fittings. It could also be installed at the entrances and exits of fluid control assemblies in order to provide isolation of the assemblies in the event of a fire.

The term "process industry fluid line", or the like, as used herein means dangerous liquid or dangerous gas carrying networks carrying such fluid at high pressure (at least 500 psi; and typically 300–3000 psi) in piping of less than six inches diameter typically ⅛–1 inch with an aggregate network length of such piping of over one hundred running feet.

BACKGROUND OF THE INVENTION

Currently, in order to provide fire safety in process industry, an arrangement of multiple elements is provided, with each such assembly comprising a heat detector (usually a thermocouple), a relay, an actuator (usually electrical, hydraulic, or pneumatic) and a power source The heat detector, when it detects fire temperature, sends an electrical signal to a relay, which uses this low level signal to control the power from a power source, either electrical, pneumatic, or hydraulic. The applied power drives the actuator to close the valve. Actuating power itself and relay supporting power is derived from a network overlapping the process industry fluid network and such power sources are vulnerable to fire. It has been proposed in U.S. Pat. No. 3,664,582, issued May 23, 1972, to W. F. Jackson et al. and in U.K. Pat. No. 1308107 of Vereinigte Flugtechnishche WerkeFokker GmbH, published Feb. 28, 1973, to use as the temperature detector an element made of a nickel titanium alloy and having a temperature actuated shape memory. This provides local relay function and power independent of external power. This arrangement is slower to act than is necessary, is too expensive for widespread use, occupies a large volume of space, and because of the large number of component parts is less reliable than needed. Also of interest are the sprinkler control valve systems described in copending U.S. application Ser. No. 890,026, filed Sept. 28, 1986 by Schetky et al., now abandoned, for fire sprinkler valve-opening mechanism and the like using shape memory actuation.

It is an object of the present invention to provide an emergency valve module which meets a need for reliable, fast response valves with self contained power source, in a way that is economical for effecting shut down of process fluid flow.

It is a further object of the invention to provide simple test capability integral to the valve consistent with the foregoing object.

SUMMARY OF THE INVENTION

In accordance with the present invention a shut off valve having an actuator which is also the temperature sensor is provided. External power sources and intermediary control devices are not needed. A combined actuator/sensor is made of a shape memory alloy. The properties of shape memory materials and designs for utilizing them are descrited in the above cited application of Schetky et al. and elsewhere.

The shape memory effect alloy material is tailored for use herein to have a transition temperature range (which is dependent on the composition and production custom of the material) such that the valve closes at required temperatures. While it is possible to employ many shape memory effect materials for the valve member, including the nickel-titanium alloy referred to in the above mentioned patents, it is preferred to use copper based alloys as described in Schetky et al.

Other objects, features, and advantages will be apparent from the following detailed description of preferred embodiments taken in conjunction with the accompanying drawing in which:

DETAILED DESCRIPTION OF PREFERRED EMBODIMENTS

Figure 1:
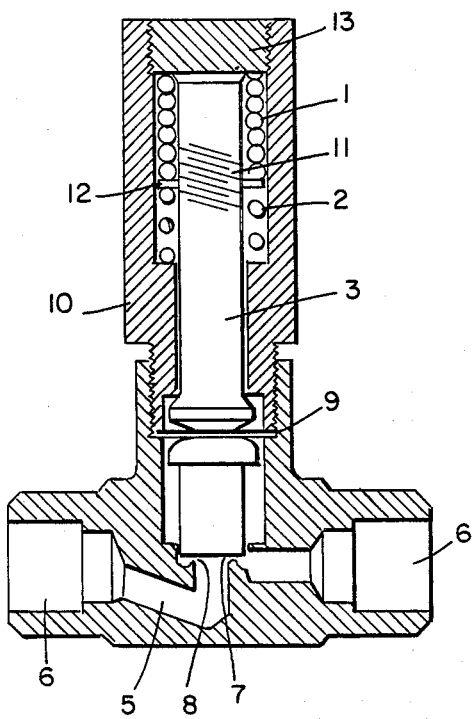
FIG. 1 is an axial section through a first embodiment shut off valve in accordance with the invention.

In FIG. 1 a passage is shown at 5 for the passage of fluid (liquid or gas) to be controlled in the case of fire. The passage 5 is connected to tubing or piping of a process by means of welding, threaded connections, compression fittings, or other means at 6. A valve member 7, called a lower stem, seals against an orifice, the edges of which comprise a seat 8. The lower stem 7 is welded to a diaphragm 9. The diaphragm is held in position, thus effecting a seal, by the threaded valve member 10 called a bonnet. The diaphragm 9 isolates the process fluid, which passes through piping sections 5 and 6, from the valve mechanisms. A diaphragm is just one example of means to contain the process fluid within the valve. Other means are also commonly used.

The diaphragm 9 is also connected to the upper stem 3 which is driven by the shape memory effect actuator 1 and bias spring 2 sub-assembly. Bias spring 2 biases spring 1 away from the fully closed condition as shown in FIG. 1. Stem 3 has a threaded portion 11 upon which a threaded disc 12 is positioned to contain the bias spring 2 and to adjust the amount of bias spring load. A threaded plug 13 allows for adjustment of the shape memory effect actuator length and thus operating performance. The compression spring 1 is made of shape memory effect alloy having an elastic modulus which varies significantly with temperature in a reversible manner over a transition temperature range. Such an alloy is well known, the alloy preferred for use in the present invention being a copper based alloy.

The actual proportions of the constituents vary according to the temperature requirements. The alloy consists of between 68 and 80 percent copper. The remaining twenty to thirty two percent consists of zinc and aluminum in various proportions. Lower aluminum containing alloys have lower transformation temperatures than high aluminum content alloys.

The alloy is heat-treated to bring it into a condition in which it exhibits a martensitic transformation when subject to temperature change in the transition range. The alloy is heated until its crystal structure assumes a high temperature configuration called the beta phase. Next the alloy is rapidly cooled so that the atoms in the metal rearrange themselves into the crystal form of martensite. The characteristic displayed by the alloy is progressive increase in stiffness of the spring 1 as the temperature rises through the range. At or below the lower end of that range, the stiffness is low and bias spring 2 which does not show a significant change in elastic modulus with temperature, urges spring 1 into the condition shown. As the temperature of spring 1 increases, the stiffness also increases with the result that the turns of the spring are progressively spaced apart generating force as they expand.

Figure 2:
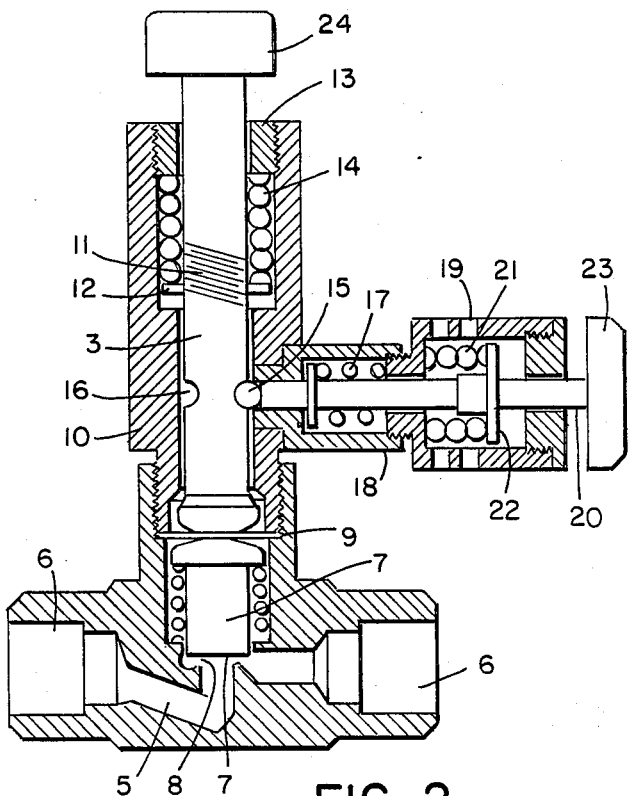
FIGS. 2 and 3 are similar sections of other such embodiments incorporating a test capability.

The FIG. 2 embodiment comprises a variation of the actuating mechanism of FIG. 1. In this variation items 3–12 are functionally identical to items 3–12 of FIG. 1. A valve closure spring 14 of conventional spring material is positioned around stem 3. The amount of spring load is adjustable by either disc 12 or plug 13. The spring load cannot drive the stem 3 to close the valve because of the presence of the detent ball 15 in the circumferential groove 16 in the stem 3. The detent ball is held in position against the force of the valve closure spring 14 by the bias spring 17 which is contained in housing 18 which is attached to 10. Bias spring 17 is positioned around shaft 20. Housing 19 is threaded into housing 18, the degree of insertion providing adjustment of the bias spring force. The helical coil shape memory spring 21 is positioned around shaft 20 between the wall of housing 19 and the positionally adjustable disc 22. Shaft 20 is threaded in the vicinity of disc 22 to allow adjustment of the shape memory spring length and thus performance. A handle for testing 23 is provided at the end of the shaft 20 and a reset handle is provided at the end of stem 3.

Figure 3:
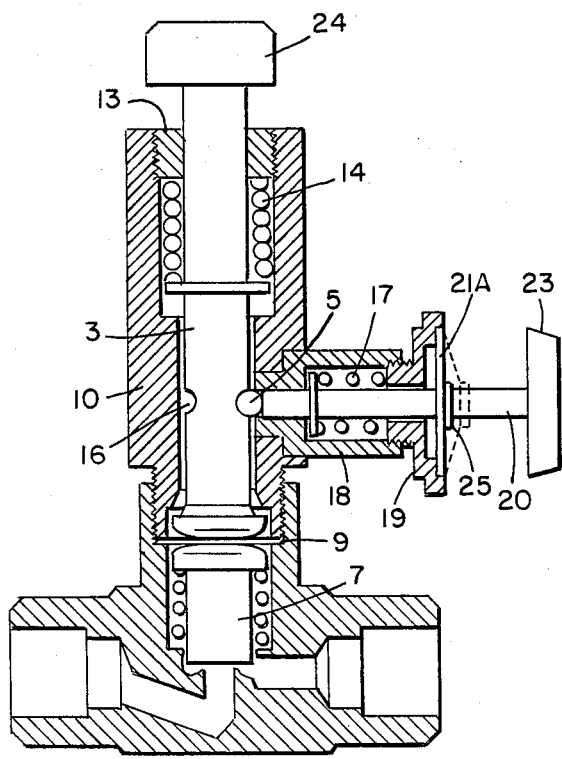

FIG. 3 shows a variation of the FIG. 2 structure. A rectangular bending beam shape memory actuator is utilized as an example of other configurations of shape memory elements that could be used to generate force and displacement. Items 1–20 are functionally identical to items 1–20 of FIG. 2. Shape memory element 21 is held in position against housing collar 25 which is fixed to shaft 20 by threaded means.

For low process pressures valve sealing forces are relatively low and the actuator may act directly to seal the valve such as illustrated in FIG. 1. This valve is similar to conventional diaphragm seal valves (a bellows seal could also be used). A metal to metal orifice seal is provided in case fire reaches the valve. The diaphragm isolates the actuating mechanisms from the process fluid. When ambient temperature rises above the transition temperature the shape memory actuator (1) undergoes a phase transformation and expands overcoming the opposing force of the bias spring 2. The shape memory actuator drives the stem 3 into the seat 4 effecting a seal. When the ambient air cools below the transition temperature the shape memory actuator, having two way memory contracts back to the closed position, opening the valve. If desired, a detent mechanism could be used to prevent the valve from opening when the ambient air cools.

For higher process pressures larger forces are needed to seal the valve. Shape memory effect actuators having larger mass would te needed to generate these larger closure forces. Actuators with larger mass will respond slower to a heat impulse than smaller mass actuators. To insure fast reaction to a heat impulse indirect operation is desirable wherein a relatively small shape memory effect force controls the necessary larger valve closure force. Such a valve is illustrated in FIG. 2. This valve has the features of testability and resettability. Stem 3 thereof is biassed to closure by means of the relatively strong compressed steel valve closure spring 14. It is prevented from closing by the detent ball. The detent ball is held in position by the actuator shaft 20 and the relatively weaker bias spring 17 which is in compression. At room temperature the shape memory spring 21 is fully closed. At fire temperature it expands to the right, instantly overcoming the force of the bias spring 17. The force on ball detent 15 is released allowing the valve closure spring 14 to push the stem down, closing the valve. The valve can be tested by pulling the test handle 23, overcoming the bias spring 17. The valve will now close. Releasing the test handle and pulling the reset handle 24 will compress the valve closure spring 14. When the tall detent 15 snaps into place the reset handle can be released. This valve could also function as an on-off valve. Pulling the test handle 23 closes the valve. Pulling the reset handle 24 opens the valve.

FIG. 2 shows the shape memory actuator in the form of a helical coil spring. Other forms of actuator such as cantilever, bending team, or others may be used.

FIG. 3 shows an alternate method of actuation using a shape memory bending beam 21A (solid lines) shown in the tending beam position at temperature below the transition temperature. When the ambient air temperature rises above the transition temperature the beam bends (dotted lines) releasing the holding force on the detent ball 15, allowing the valve closure spring 14 to close the valve, as described above.

Figure 4:
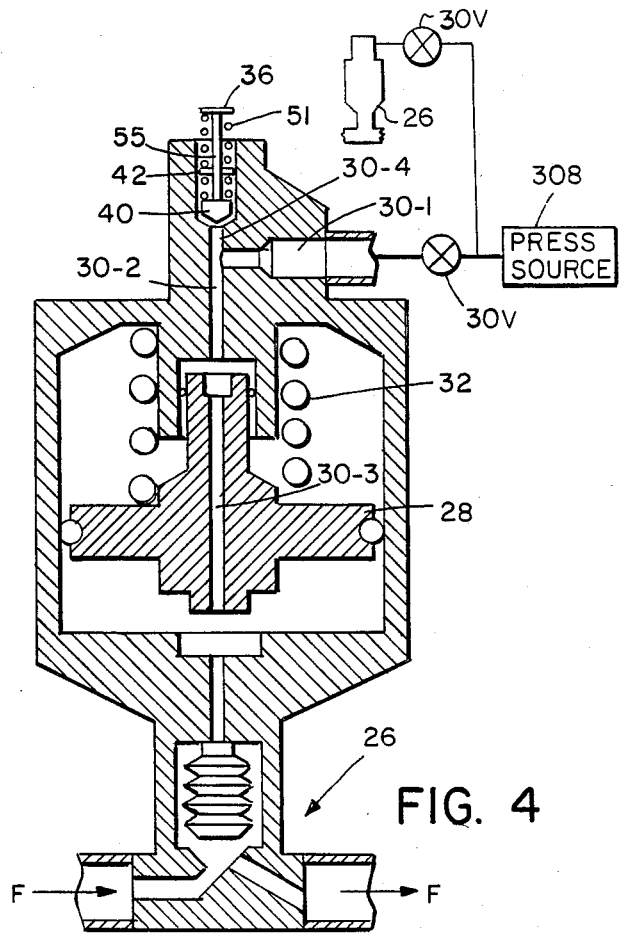
FIG. 4 is a similar section of further such embodiment operating as a pilot valve in cooperation with a main valve to be shut down in an emergency.

FIG. 4 shows an embodiment of the invention usable in a pneumatic control system.

In a pneumatic control system air pressure opens and closes a process line valve allowing or stopping the flow of process fluid. In the event of a fire or other over temperature emergency it may be desirable to quickly open or close the process line valve. Detection systems such as described above may be used to change the air pressure to an emergency condition (on or off). Such systems have the limitations described above. A more reliable, faster acting means is shown in FIG. 4 installed into a commonly available commercial air operated process line valve 26. A shape memory effect spring 51 is positioned to drive a flange 36, shaft 55 and poppet 40 against the force of a bias spring 42. The shape memory actuated valve controls the air supply to the air operated valve 26 which controls the process fluid. The air operated valve, comprising a piston 28 is controlled by air from a pressure source 30P and valve 30V admitting air via passage 30-1, 30-2, 30-3 to force the piston upward against a bias spring (or allow the piston to close as air feed, or pressure use, is attenuated or reversed). The shape memory actuated valve reacts to an emergency over temperature condition by releasing the control air pressure to atmosphere, depriving the air operated valve of its air via path 30-1, 30-4 supply. Control air pressures are typically 30–100 psi, the return spring 32 is made of conventional metal and is constructed so that, when air pressure is relieved, it drives the valve mechanisms opposite to the force of the air opening or closing the process line valve, as desired. Thus closure or opening of the process line is achieved by deprivino the air operated valve of its air supply. Alternatively to releasing the control air to atmosphere is closing the control air ports, means of blockage of the air.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Self-actuating, quick acting, ambient temperature responsive valve, resettable and testable by hand operations, for insertion in an industrial process fluid comprising:

valve body means with a fluid flow line portion and a valve seat opening port within the fluid flow line portion;

(b) means defining first and second activating stem portions actuatable together for valve opening and closing motion and arranged to block or clear said port in valve closed and open positions, respectively;

(c) means for providing leak-tight line fluid/gas ambient separation between the first and second stem portions;

(d) a valve closing driven in combination with shape memory actuating means for adjusting, reversibly between first and second configurations, driven by mechanical constraint below a critical ambient temperature and shape memory expansion above said temperature in a quick acting, high force expansion; and (e) reset means for automatically resetting the shape memory material the said shape memory activating means (d) comprising a spring balanced force applying means of non-shape memory form and shape memory material driven-pilot operator means, the latter including a stop for the non-shape memory movement means and shape memory-activated stop removal means, and hand operable means for test drive of the shape memory movement means to test the non-shape memory means, the non-shape memory means including hand operable means for resetting them.

2. Valve system in accordance with claim 1 and further comprising hand adjust means to calibrate activating force and response.

3. Valve system in accordance with claim 1 wherein the shape memory means are constructed and arranged to provide shape memory-critical temperature at a fire temperature level.

4. An array of valve systems as set forth in claim 1 in combination with a fluid line system providing multiple cut-off points to automatically isolate line system sections by valve closures within and at the boundaries of a high temperature, emergency condition using the stored energy of spring means within each valve and without reliance on an electric or hydraulic/pneumatic line power and/or signal network.

5. Valve system in accordance with claim 1 wherein the valve-member-driving means comprises a first manually liftable handle for raising the stems, detent means to lock the stems in a fluid-flow-allowed position, a second manually liftable handle for test purposes controlling placement of said detent means and temperature-responsive shape memory means controlling placement of said detent means.

* * * * *